United States Patent
Goodman et al.

(10) Patent No.: US 6,636,529 B1
(45) Date of Patent: Oct. 21, 2003

(54) SEMI TRANSPARENT TRIBUTARY FOR SYNCHRONOUS TRANSMISSION

(75) Inventors: David M Goodman, St Albans (GB); Jayne Brady, Belfast (GB); Chris Murton, Chelmsford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/414,367

(22) Filed: Oct. 7, 1999

(51) Int. Cl.$^7$ .................................................. H04J 3/16
(52) U.S. Cl. ........................................ 370/469; 370/466
(58) Field of Search ................................ 370/410, 466, 370/469, 470, 907; 725/93

(56) References Cited

U.S. PATENT DOCUMENTS

| | | | |
|---|---|---|---|
| 5,459,722 A | * 10/1995 | Sherif | 370/410 |
| 5,539,448 A | * 7/1996 | Verhille et al. | 725/93 |
| 5,857,092 A | * 1/1999 | Nakamura et al. | 370/466 |

FOREIGN PATENT DOCUMENTS

| | | | |
|---|---|---|---|
| EP | 1091593 A2 * | 4/2001 | H04N/7/52 |

OTHER PUBLICATIONS

U.S. patent application Ser. No. 09/166,814, filed Oct. 6, 1998, Concatention of Containers in Synchronous Digital Hierarchy Network.

U.S. patent application Ser. No. 09/143,465, filed Aug. 27, 1998, Payload Mapping in Synchronous Networks.

U.S. patent application Ser. No. 09/307,812, filed May 10, 1999, Protocol Independent–Rate Device.

U.S. patent application Ser. No. 09/349,087, filed Jul. 8, 1999, Mapping Arbitrary Signals into SONET.

* cited by examiner

*Primary Examiner*—Salvatore Cangialosi
(74) *Attorney, Agent, or Firm*—Barnes & Thornburg

(57) ABSTRACT

An interface for converting a variety of incoming digital signals into SDH/SONET format for transmission on a synchronous digital network, by identifying the line code of the incoming digital signal, without identifying the information for OSI layer 2 or 3 processing, i.e. format of each packet. Headers are used to encapsulate incoming packets, and enable packets to be discriminated at the receiver. Advantages of performance monitoring capability and transparency are combined. Identifying line codes enables a greater degree of error detection, than a bit based interface. Also synchronisation can be simpler since line codes for padding can be added or deleted more easily than adding or subtracting bits. The interface is semi-transparent in the sense that identification of line codes limits the interface to those formats that use identifiable line codes, but without limiting to a particular OSI layer 2 or 3 frame format.

19 Claims, 5 Drawing Sheets

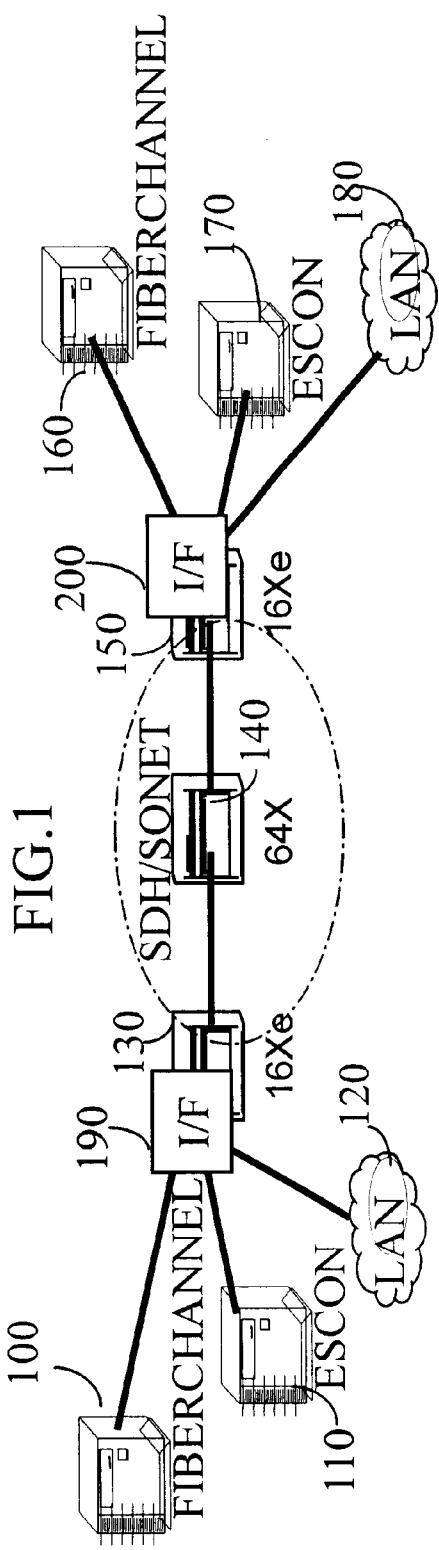
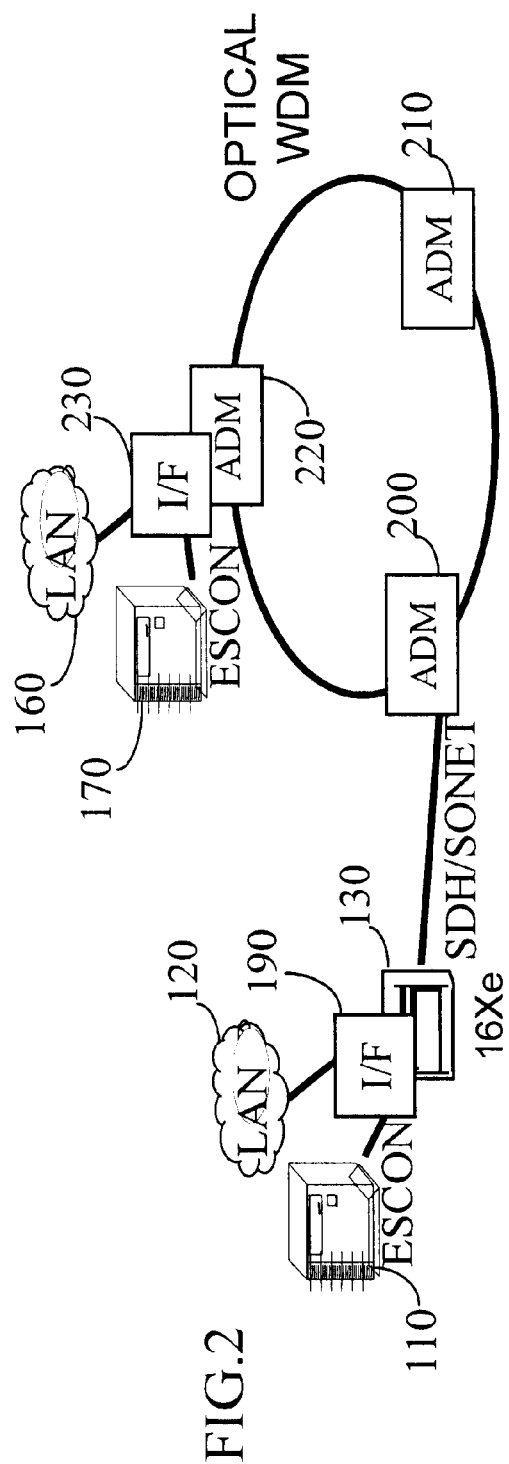

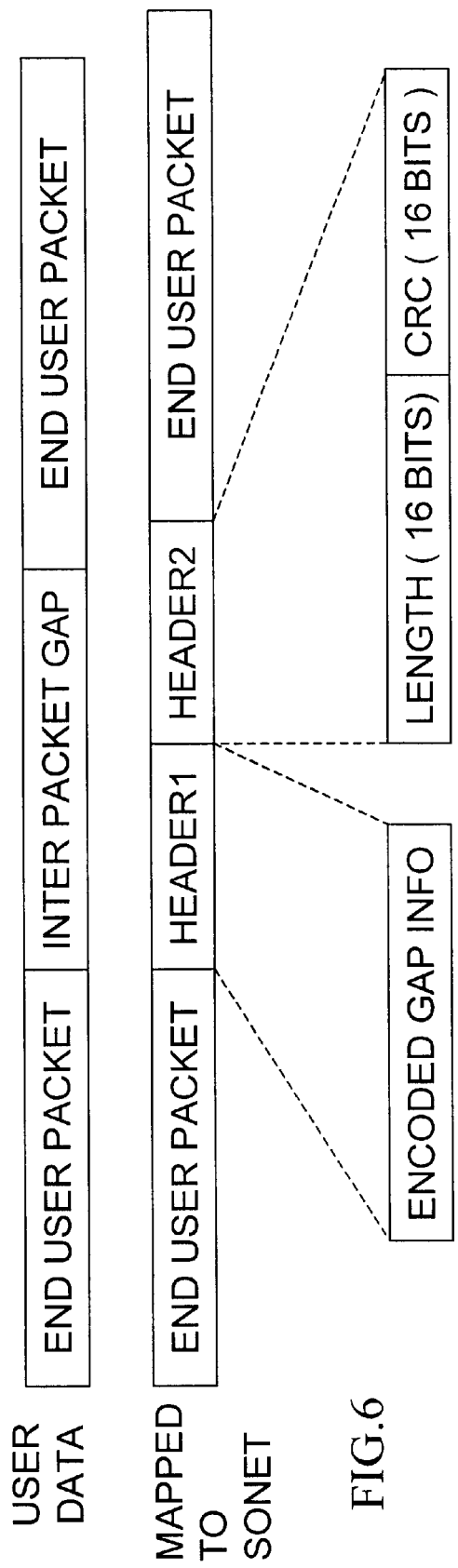
FIG.6
FIG.7
SH = SPECIAL HEADER,  NH= NORMAL HEADER,  EofS= Encode of SOF,
EofE= Encode of EOF

SEMI TRANSPARENT TRIBUTARY FOR SYNCHRONOUS TRANSMISSION

RELATED APPLICATIONS

This application relates to U.S. patent application Ser. No. 09/166,814 filed Oct. 6, 1998 (Nortel Networks reference no ID1048) entitled CONCATENTION OF CONTAINERS IN SYNCHRONOUS DIGITAL HIERARCHY NETWORK, and to U.S. patent application Ser. No. 09/143,465 filed Aug. 27, 1998 (Nortel Networks reference no ID0889) entitled PAYLOAD MAPPING IN SYNCHRONOUS NETWORKS, U.S. patent application Ser. No. 09/307812 (Solheim et al, entitled "Protocol Independent-Rate Device" filed on May 10, 1999 and assigned to Nortel Networks Corporation) and U.S. patent application Ser. No. 09/349087 (Roberts, entitled "MAPPING ARBITRARY SIGNALS INTO SONET", filed on Jul. 8, 1999 and assigned to Nortel Networks Corporation, ref. 10420RO) all hereby incorporated by reference in their entirety.

FIELD OF THE INVENTION

The invention relates to interfaces for converting an incoming digital signal into a format for transmission on a synchronous digital network, to network elements comprising such interfaces, to corresponding receiver interfaces, to network elements having such interface, to corresponding methods and software, to methods of using data transmission services to cause data to be transmitted over such interfaces, and to methods of detecting transmission errors using such interfaces.

BACKGROUND TO THE INVENTION

It is known to provide local area networks using protocols such as IEE 802.3, and ethernet (available in 10 megabits per second, 100 megabits per second and 1 gigabits per second versions), and to couple local area networks together to create wide area networks (WAN). Wide area networks often use the public telecommunications network. Conversion is required from LAN protocols to conventional telecoms interfaces, for example E1, E3, T1 and STM-1. ESCON (Enterprise Systems Connection) and Fibrechannel are further examples of known LANs or Storage Area Networks, for connecting multiple storage devices.

It is also known to connect LAN's using optical transmission links, or optical transmission networks. There is a large installed base of SONET/SDH systems which can provide a transport service for ATM, SMDS, Frame Relay, T1, E1 and so on.

Mapping of one rate or format into another is well known. However, the standard or proprietary scheme allows transportation of a very specific set of signals, with format specific hardware. Generally separate hardware is required to map each type of signal onto SONET. It is known to map both continuous signals, which are synchronised to a clock, and burst format signals, which do not have a continuous clock. To transmit continuous signals, a wrapper is added to the continuous signal. However this produces formats which don't have a pre-defined fixed bit rate. The resulting signal cannot be time multiplexed to be transported on a high speed network, otherwise the phase or synchronicity of the information is lost.

It has also been proposed to transmit LAN signals such as ethernet signals directly over a DWDM (Dense Wavelength Division Multiplexing) link without using a synchronous protocol such as SONET/SDH. This implies one of the wavelengths is dedicated to the LAN signal, as there is no way to multiplex other signals onto the same wavelength. This may leave the great majority of the bandwidth of the given wavelength unused, which may be unsatisfactory in some circumstances.

U.S. patent application Ser. No. 09/307812 (Solheim et al, entitled "Protocol Independent-Rate Device" filed on May 10, 1999 and assigned to Nortel Networks Corporation) discloses a method of transporting different types of clients (IP, ATM, SONET, Ethernet etc) together. The bandwidth assigned to any given sub-rate channel can be provisioned without changing the hardware or software. U.S. patent application Ser. No. 09/349,087 (Roberts, entitled "Mapping Arbitrary Signals Into SONET", filed on Jul. 8, 1999 and assigned to Nortel Networks Corporation, ref. 10420RO), discloses mapping arbitrary signals into SONET to enable the signals to be recovered with low timing jitter at low cost. A mapper multiplexes numerous tributaries into the high rate SONET network. The mapper acts at the bit level to distribute stuffed bits uniformly interspersed across a frame, to enable an arbitrary input signal to be mapped onto the predefined fixed rate of the SONET/SDH output. This scheme and the above DWDM scheme both maintain inter frame information, and are both transparent to any frame format, meaning they are able to transport any frame format. However neither are frame aware and so have the disadvantage of not being able to carry out performance monitoring.

Other known schemes include encapsulation of frames for transmission, e.g. HDLC, (High-Level Data Link Control) and SDL(Simple Data Link), published by Lucent on the IETF web pages. The SDL publication is a proposal for encapsulating frames such as PPP (Point to Point Protocol) using SDL onto SONET/SDH. Such encapsulation schemes are frame aware and so can carry out performance monitoring. However, they have the disadvantages of not preserving information in the inter frame gaps, and of the mapping being specific to the frame format, so the schemes are not transparent.

It is also known to provide an interface between an ethernet network and a SONET/SDH system at a router or a bridge. In this case, the router or bridge may have interfaces dedicated to more than one LAN protocol, and may multiplex data on to the SONET/SDH system, but this involves recognising the layer 2/3 protocol which defines the contents of each frame or packet.

A disadvantage of such devices is the complexity of processing the layer 2/3 information, and the buffering of packets intended for various destinations. Accordingly, such devices are dedicated, and cannot handle frames or packets of an arbitrary layer 2/3 protocol.

SUMMARY OF THE INVENTION

It is an object of the invention to improve on the known schemes. According to a first aspect of the invention there is provided a sending interface for converting an incoming digital signal into a format for transmission on a synchronous digital network, the incoming digital signal having a group of bits coded by a predetermined line code, the incoming digital signal also carrying information for OSI layer 2 or 3 processing, the sending interface comprising:

circuitry for identifying the line code of the incoming digital signal, and circuitry for carrying out the conversion of the incoming digital signal according to the line code identified, and independently of the information for OSI layer 2 or 3 processing.

This is the first time the advantages of performance monitoring capability and transparency have been possible together, as will now be explained. An advantage of identifying line codes is that it enables a greater degree of error detection and thus performance monitoring, compared to a bit based interface. This can be particularly significant if the interface is at a boundary between operating entities, such as a client/service provider boundary. Especially in such a case it can enable QoS (Quality of Service) to be offered and measured at a client/service provider boundary.

Another advantage of the conversion being line code aware, is that synchronisation can be simpler since line codes for padding can be added or deleted more easily, using lower specification hardware, than is needed for adding or subtracting bits. The interface can be semi-transparent in the sense that identification of line codes limits the interface to those formats that use identifiable line codes, but without limiting to a particular OSI layer 2 or 3 frame format.

Also, since OSI level 2 or 3 processing as carried out in a conventional router for example, is relatively complex, the interface of the invention can be greatly simplified and thus more easily integrated into other equipment, compared to the router for example. An advantage of the use of a synchronous digital network is that it facilitates multiplexing, and other transmission benefits.

Preferred Features

Preferably the circuitry for identifying a line code comprises circuitry for identifying an idle code in the incoming digital signal. An advantage of this is that it enables the start and end of information streams such as variable length packets to be identified.

Preferably the circuitry for identifying a line code comprises circuitry for identifying a type of idle code, and the circuitry for carrying out the conversion is arranged to include in the synchronous data signal the type of idle code identified. An advantage is that information carried using different types of idle code will not be lost through the conversion.

Preferably the incoming digital signal comprises packets, and the circuitry for carrying out the conversion is arranged to replace one or more of the idle codes with a header for indicating the length of an associated one of the packets. This can enable a downstream receiver to identify the end of the associated packet, and thus identify idle codes, and maintain synchronicity with respect to packets and gaps between packets.

Preferably the header is of a fixed size. This can make synchronisation in the receiver easier.

Preferably the interface is arranged to adapt to receive incoming digital signals of more than one rate. An advantage is that the need for separate hardware and software for each rate is no longer needed. The adaptation could be automatic or carried out under the control of a network management system.

Preferably the format for the synchronous digital network comprises SONET/SDH virtual containers.

Preferably the interface comprises circuitry for carrying out virtual concatenation of the SONET/SDH virtual containers. In this specification, the term "virtual concatenation" is used where the underlying network is unaware of any special relationship between the virtual containers which make up a group of virtually concatenated virtual containers. Particularly, although not exclusively, such frame based data may comprise OSI layer 2 data frames. An advantage is that delay variations between different paths in an SDH/SONET network can be handled.

Preferably the interface comprises a multiplexer for multiplexing more than one incoming digital signal onto the synchronous digital signal. An advantage is that bandwidth can be used more efficiently.

Other Aspects of the Invention

According to another aspect of the invention there is provided an interface for converting an incoming digital signal into a format for transmission on a synchronous digital network, the incoming digital signal having a series of packets, and a group of bits coded by a predetermined idle code separating the packets, the interface comprising:

circuitry for identifying the idle code of the incoming digital signal, and circuitry for carrying out the conversion of the incoming digital signal according to the idle code identified.

According to a further aspect of the invention there is provided a receiver interface for recovering an incoming digital signal that has been converted to a signal of a format for a synchronous digital network, the incoming digital signal having a group of bits coded by a predetermined line code, the incoming digital signal also carrying information for OSI layer 2 or 3 processing, the receiving interface comprising:

circuitry for identifying linecode information in the formatted signal, and circuitry for replacing the identified linecode information with corresponding linecodes independently of the information for OSI layer 2 or 3 processing.

An advantage is that this enables performance monitoring capability and transparency to be combined.

Preferably the interface comprises a retimer, for inserting or deleting one or more of the linecodes to match the incoming data rate to the required outgoing data rate.

Preferably the receiver interface is arranged to receive SONET/SDH virtual containers.

Preferably the receiver interface comprises circuitry for combining information from virtually concatenated containers before recovering the original incoming digital data signal.

Another aspect of the invention provides a corresponding method of, and corresponding software for converting an incoming digital signal into a synchronous digital signal.

Another aspect of the invention provides an SDH/SONET network element comprising the above interface.

Another aspect of the invention provides a system comprising the above receiving interface and circuitry for monitoring QoS performance.

Another aspect of the invention provides a method of using a data transmission service provided over a telecommunication network, comprising the step of causing data to be transmitted across the above interface.

Any of the preferred features may be combined with any of the aspects set out above as would be apparent to a skilled person.

Other advantages will be apparent to a skilled person, particularly in relation to any further prior art other than that discussed above.

BRIEF DESCRIPTION OF THE DRAWINGS

Embodiments of the invention will now be described in more detail by way of example, with reference to the accompanying drawings, in which:

FIGS. 1 and 2 show typical telecommunications networks for data transmission which may make use of embodiments of the interface.

FIG. 6 shows in schematic form how an inter packet gap is replaced with header information in an embodiment of the interface, and FIG. 7 shows how the format of an incoming fibre channel frame is altered in the interface.

DETAILED DESCRIPTION

Figure 3:
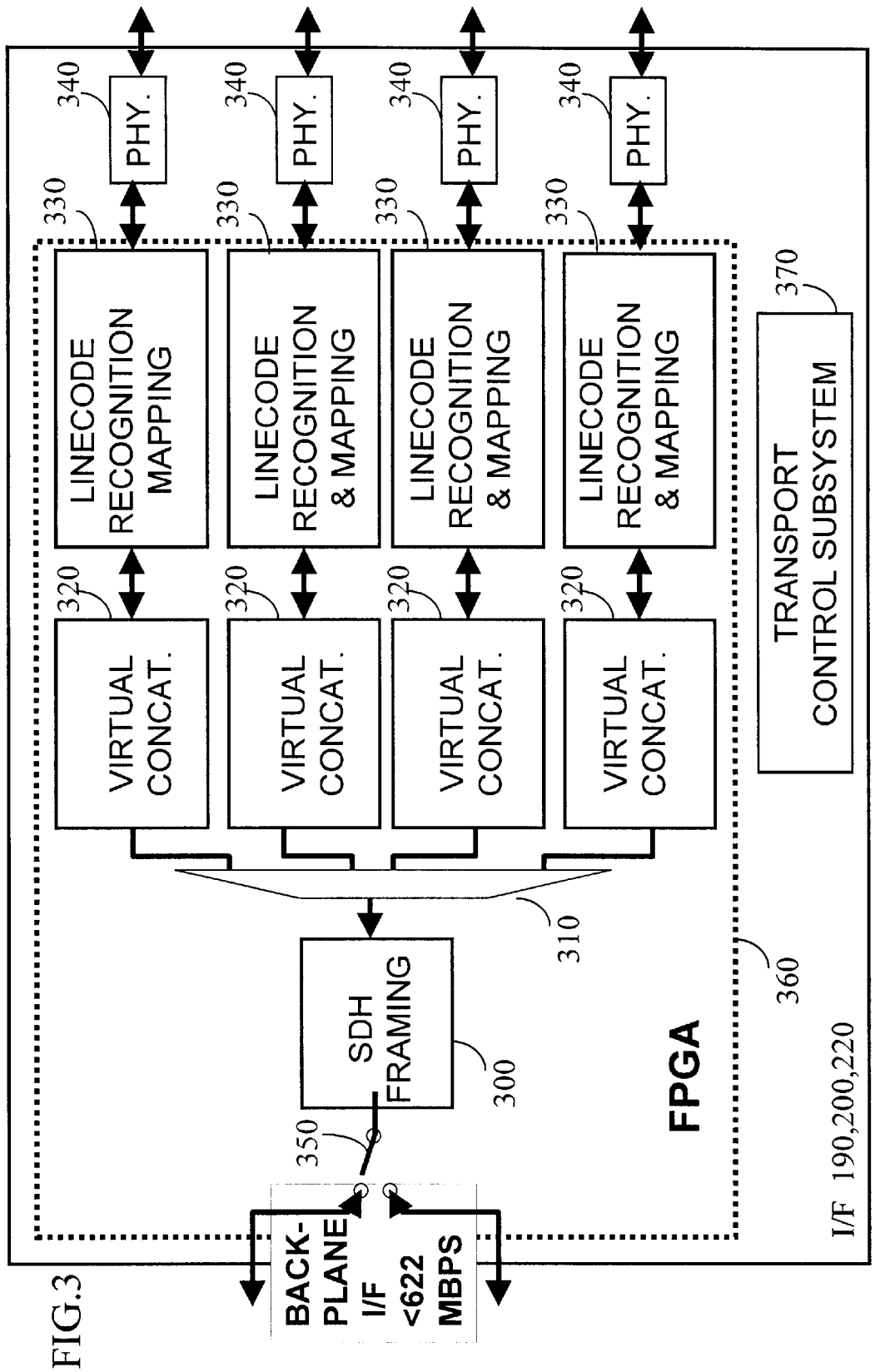
FIG. 3 shows in schematic form, hardware elements of an embodiment of the interface.

The embodiments described below have been conceived with a number of considerations in mind, including:

To transport a number of different packet protocols between end users over a Sonet/SDH network.

To implement a tributary card (trib) for Sonet/SDH ADMs which can carry the widest possible range of packet protocols and data rates.

To transport the packets as efficiently as possible in terms of required network bandwidth by using virtual concatenation if appropriate.

The examples described rely on the fact that a number of different packet protocols have a key feature in common. That is the transmission over a media of a constant bit stream with special codes used to indicate the gap between packets (and therefore the start and end of packets). Therefore if an interface such as a Sonet/SDH trib can recognise the 'gap' code (usually called 'Idle' code) appearing on the end user interface, it can also recognise complete packets on this interface. On recognition of a complete packet, the Sonet/SDH trib can transfer the packet over the Sonet/SDH network to the ultimate destination. The packet must be transferred at a rate equal to or higher than the maximum data arrival rate.

On receipt of the packet at the destination Sonet/SDH trib (it is only necessary to await the start of the packet), the trib can deliver the packet to the end user at a 'nominal' rate. Some protocols use different Idle codes to transfer information. The type of idle code is also transferred across the SDH link and reproduced at the destination.

FIGS. 1 and 2, SONET/SDH Data Networks

FIGS. 1 and 2 show in schematic form typical telecommunication networks for data transmission, in which embodiments of the interface may be used. The SONET/SDH format for a synchronous data network will now be described briefly.

Data transmission formats can be divided into synchronous or continuous formats such as SONET/SDH, and asynchronous or burst formats. Burst formats do not have a continuous clock, transmission of such signals do not require any given phase relationship between bursts. On the other hand, the phase of the clock of continuous formats has continuity under normal conditions, and the frequency of the clock is bounded. Examples of such bounds are ±20 ppm (parts per million of the bit rate) and ±100 ppm.

The dominant signal format in fiber optic networks follows the synchronous standard SONET in North America and SDH elsewhere. In this specification, the term SONET/SDH will be used as a general term for both formats. SONET enables multiplexing, adding and dropping, and general transportation of signals. For a service, being able to be easily transported by a SONET network is a valuable attribute, in that it enables the network providers to make use of the large base of installed SONET-compatible equipment.

SONET is a physical carrier technology, which can provide a transport service for ATM, SMDS, frame relay, T1, E1, etc. As well, operation, administration, maintenance and provisioning (OAM&P) features of SONET provide the ability to reduce the amount of back-to-back multiplexing, and more importantly, network providers can reduce the operation cost of the network.

The SONET standards ANSI T1.105 and Bellcore GR-253-CORE, define the physical interface, optical line rates known as optical carrier (OC) signals, a frame format, and an OAM&P protocol. Opto/electrical conversion takes place at the periphery of the SONET network, where the optical signals are converted into a standard electrical format called the synchronous transport signal (STS), which is the equivalent of the optical signal. Namely, the STS signals are carried by a respective optical carrier, which is defined according to the STS that it carries. Thus, an STS-192 signal is carried by an OC-192 optical signal.

The STS-1 frame consists of 90 columns by 9 rows of bytes, the frame length is 125 microseconds. A frame comprises a transport overhead (TOH) occupying 3 columns by 9 rows of bytes, and a synchronous payload envelope (SPE) occupying 87 columns of 9 rows of bytes. The first column of the SPE is occupied by path overhead bytes.

As such, an STS-1 has a bit rate of 51.840 Mb/s. Lower rates are subsets of STS-1 and are known as virtual tributaries (VT), which may transport rates below DS3. Higher rates, STS-N, where N=1, 3, 12, . . . 192 or higher, are built by multiplexing tributaries of a lower rate, using SONET add/drop multiplexers. An STS-N signal is obtained by interleaving N STS-1 signals. For example, an STS-192 is made of 192 STS-1 tributaries, each separately visible, and separately aligned within the envelope. The individual tributaries could carry a different payload, each with a different destination.

The STS-N has a TOH made of all N TOHs of the individual tributaries, and a SPE made of all N SPEs of the tributaries, each with its own POH. Some services, that operate at a higher rate, are transmitted in an STS-Nc signal (c for concatenation). The STS-1s into the STS-Nc signal are kept together. The whole envelope of the STS-Nc signal is routed, multiplexed and transported as a single entity rather than as N individual entities. The TOH and the start of the SPE for the N constituents are all aligned, since all the constituents are generated by the same source, with the same clock. The first STS-1 in the concatenated signal carries the single set of POH, all that is required for an STS-Nc.

Mapping of one rate or format into another is well known. Bellcore TR-0253 describes in detail the standard mappings of the common asynchronous transmission formats (DS0, DS1, DS2, DS3, etc) into SONET. Similar mappings are defined for the ETSI hierarchy mapping into SDH. Optical transmission equipment has mapped one proprietary format into another. For example, FD-565 could carry Nortel's FD-135 proprietary format as well as the DS3 standard format. However, the standards or proprietary schemes allow transportation of a very specific set of signals, with format specific hardware. These methods of mapping cannot be used to map rates that vary significantly from the standard. Furthermore, these mappings are each precisely tuned for a particular format and a particular bit-rate, with e.g. a ±20 ppm tolerance. If a signal has, for example, a bit rate even 1% different than that of a DS3, cannot be transported within SONET. In addition, a different hardware unit is generally required to perform the mapping of each kind of signal. A line coding such as 8B/10B or 4B/5B may be used and produces a format with a higher rate than the original signal.

FIG. 1

FIG. 1 illustrates how an ESCON device 110 a fiberchannel device 100, and an ethernet LAN 120 may be coupled to other similar devices over a synchronous digital network such as an SONET/SDH network. The ESCON fiberchannel and ethernet devices are coupled to an SONET/SDH terminal multiplexer 130 which may be a 16Xe device as labelled. The ESCON fiberchannel and ethernet inputs are regarded as tributaries. They may be in electrical or optical form. They are aggregated in the terminal multiplexer using a sending interface 190 according to an embodiment of the invention, examples of which will be described in more detail below. The SONET/SDH network includes intermediate elements 140 such as add-drop multiplexers (ADM) or cross-connects (one is shown labelled 64X).

A further terminal multiplexer 150 receives the SONET/SDH signal (which again may be either electrical or optical). The terminal multiplexer comprises a receiving interface 200 according to an embodiment of the invention, which can be used to de-multiplex and recover the original ESCON and ethernet signals, them and forward them to respective destination ESCON, fiberchannel and ethernet devices 170, 160, 180. The transmission path may of course be bidirectional if there is a receiving and sending interface at both ends.

FIG. 2

FIG. 2 shows a similar network this time including both and SONET/SDH part and an optical part in the form of a ring. Three ADMs, 200,210,220 are shown on the ring. Where applicable, the same reference numerals have been used as in FIG. 1. The fiberchannel devices have been omitted for the sake of clarity. Various different architectures are conceivable for a SONET/SDH network. The optical ring may be WDM. In this case, a sending interface 190 according to an embodiment of the invention is provided in the 16Xe terminal multiplexer 130. The receiving interface 230 is provided partly at the ADM device 220 on the optical ring and partly at the junction of the SONET/SDH and the optical WDM parts. At the ADM 220 the tributaries are adapted and multiplexed into a virtual container format suitable for SONET/SDH, but are transmitted on one wavelength of the WDM network. At the junction with the SONET/SDH network, at a further ADM 200 the virtual containers may be time division multiplexed with other virtual containers, and additional overhead added. Transmission can be carried out in both directions if a sending interface and a receiving interface are provided at each end.

Control of Rate

One implementation objective is for one Trib deployed by the network operator to be able to carry several end user data protocols. Using one physical interface, it is possible to exploit the fact that Fibrechannel, Escon and optical Gigabit Ethernet protocols all use the same line code and 'Idle/special' characters. Therefore one trib can handle these protocols using the same physical interface, if the trib can adapt to the specific data rate of the end user data. At the destination end, this data rate must also be known in order to output the data. The adaptation to the end user data rate could be automatic, with the actual data rate measured and communicated automatically to the far end, or it could be configured by a network management system. Configuration by a management system may be preferred, because it permits a network operator to charge for bandwidth usage. Each alternative of automatic adaptation or configuration could be implemented following well known design principles, and so need not be described in more detail here. It is also possible to support multiple physical interfaces to additionally support other protocols such as Ethernet 100bT. Again the use of this physical interface by the end user could be automatically detected or configured. Again implementation of either could be carried out following well known design principles, and so need not be described here in more detail.

Control of Idle Codes

In order to cater for different protocols, it is necessary for the trib to either automatically detect the protocol in use, or to be configured. Once the protocol is known, the various 'Idle codes' and their meanings can be recognised at a receiver. The meaning can be transferred over the SDH link. An example of this is Fibrechannel which uses 4 octet ordered sets, each of which begins with a 'special character'. The special characters are encoded using the 10 bit format on the serial link, they cannot be encoded in SDH octets.

An alternative would be for the tribs to 'spoof' (respond to) the various codes used between packets. An advantage of spoofing is that it can reduce the delays caused by awaiting confirmation from a destination during a handshaking protocol. Such delays can significantly reduce the data rate for long distance communication (e.g. >10 km) for some protocols. For ESCON, spoofing is already an accepted technique, and it can be implemented in embodiments of the present invention, as desired.

A disadvantage of spoofing arises where the role of the semi-transparent trib is as an alternative to dark fibre/wavelength which would carry the interpacket info. Responding would mean the trib takes on a role in the end users network which is outside the user's control and probably not what the user wants.

The data rate into an SDH trib at one end, and the data rate out of an SDH trib at the other, will not be identical. This means that from time to time it will be necessary to prevent buffer under/overflow at the destination. This will be achieved by stretching or shrinking the inter-packet gap. For fibrechannel this stretch or shrink will be in steps of 4 octets. (this is the behaviour referred to by Fibrechannel as a 'Retimer').

Preferably stretch/shrink only takes place during Idles (and not during other special sequences), and only infrequently as determined by clock differences. Therefore the data transfer technique employed needs to preserve the original interpacket gaps as much as possible. Especially unpredictable expansion of the interpacket gap should be avoided because extra SDH bandwidth would be needed to cater for it. Preservation of inter-packet gaps requires that the packet delineation technique used to carry packets over the Sonet/SDH network has a known size and 'quantises' the interpacket gaps with the finest possible resolution.

FIG. 3

FIG. 3 shows in schematic form hardware features of an embodiment of the sending interface and the receiving interface, together on a single card. At the left hand side a back plane interface is shown carrying the SONET/SDH signals. Two separate paths are provided for redundancy, following well known protection path arrangements. An SDH framing device 300 is fed by a multiplexer/demultiplexer 310. This multiplexes or demultiplexes in the time domain a number of separate data paths, to couple the SDH framing device to virtual concatenation logic blocks 320.

Each virtual concatenation logic block is not essential, but if implemented, enables more efficient use of bandwidth, since a number of smaller virtual containers can be used in place of one large virtual container. Details of how to implement this virtual concatenation method are available in the above referenced U.S. patent application entitled CONCATENTION OF CONTAINERS IN SYNCHRONOUS DIGITAL HIERARCHY NETWORK and have been made public to relevant standards bodies, and so are well known to those skilled in the art, so need not be described in more detail here.

Each virtual concatenation block is coupled to a linecode recognition and mapping block 330. These blocks will be described in more detail below with reference to FIGS. 4 and 5. In summary, they are for recognising the linecode of the incoming digital signal and performing an appropriate mapping ready for inserting the signal into the synchronous digital output signal. The line code of the incoming digital signal will be recognised and used to determine start and end of frames, and therefore determine inter frame information.

Other elements on the card include physical interfaces 340 for each of the line code recognition and mapping blocks, and a transport control subsystem 370. The framing block, the multiplexer, the virtual concatenation blocks, and the linecode recognition and mapping blocks can preferably be implemented in an ASIC or FPGA type device 360. Other parts may use more conventional commercially available hardware. A typical arrangement of physical interfaces might include 2 ESCON, 2 Fiberchannel, and 4 ethernet(100 baseT), with appropriate serial-parallel and parallel-serial convertors, and clock circuitry.

When operating as a receiving interface, as will be described with reference to FIG. 5 below, the signal flow is in the reverse direction. The recognition and mapping block must restore the original signal by recognising special headers, replacing them with the original inter frame information, and insert or delete unnecessary line codes to enable the signal to be output at the original rate independent of the precise rate of the synchronous digital signal.

FIG. 4

Figure 4:
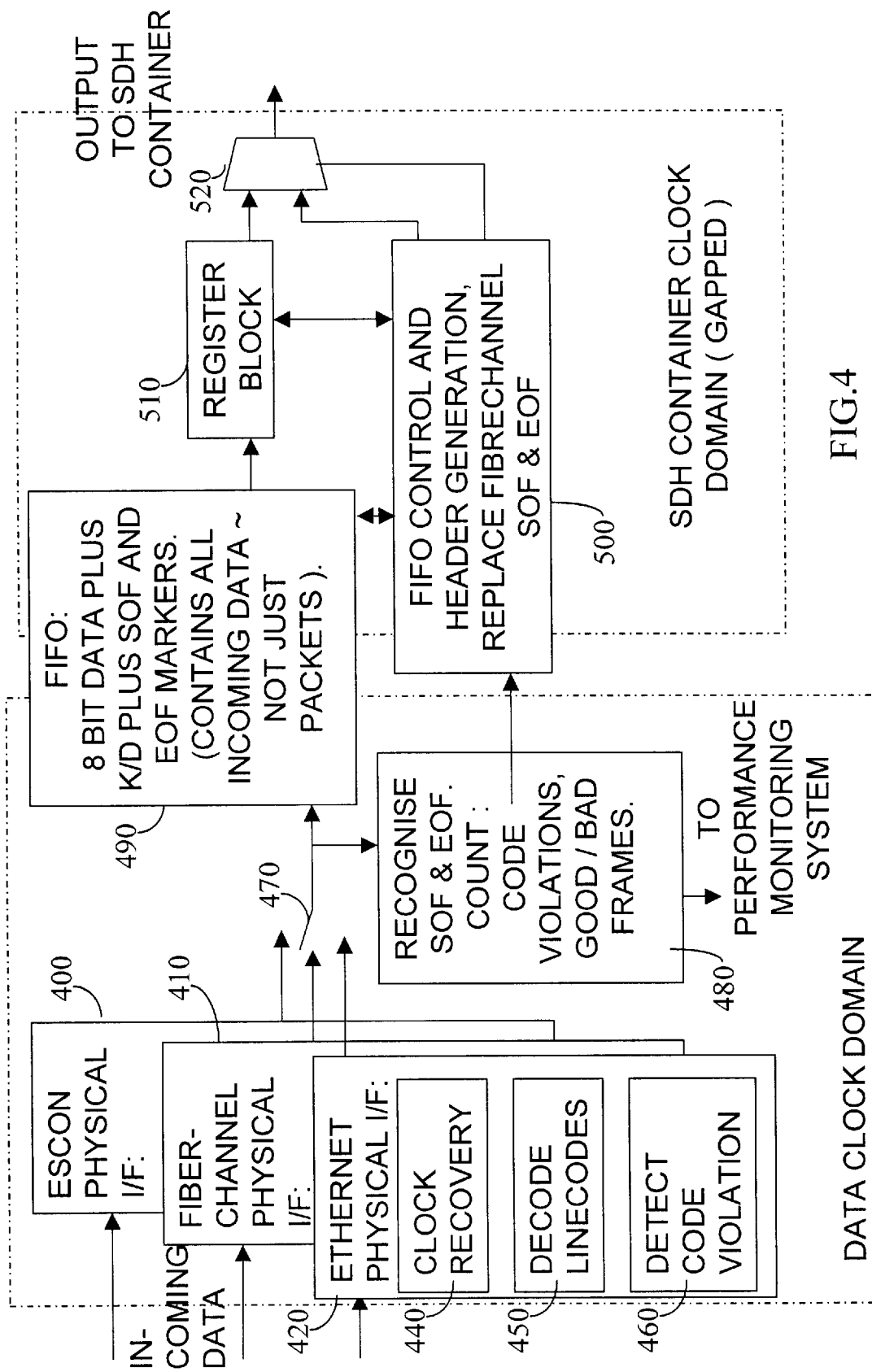
FIG. 4 shows functional elements of an embodiment of the interface.

FIG. 4 shows functional elements in an embodiment of the Linecode recognition and mapping block 330 of FIG. 3. It shows what happens to the data in one direction. The other direction is illustrated in FIG. 5.

A physical interface 400,410,420 is adaptable to different digital data signals, which may arrive on the same physical fiber or conductor. It may be made adaptable by carrying out multiple decode operations in parallel and selecting whichever works. It recovers clock, bit and byte/word alignment, it decodes the line code and may carry out serial to parallel conversion. The resulting outputs would include an 8 bit data bus plus an indication of normal or special character (KD), which will be explained in more detail below, and also indicates if it detects a linecode violation.

A selector 470 selects which physical interface or which type of decoded incoming data signal is to be fed to the next stage. A monitoring and control function 480 will take this information and recognise start of frame and end of frame, and count code violations, and numbers of good/bad frames for use by a performance monitoring system.

The data including inter-packet data is sent to a FIFO (first in, first out) 490 for retiming. As illustrated, the FIFO bridges the domain of the data clock based on the incoming data signal, and the SDH container clock. The output of the FIFO is fed to a register block which is used to replace at least some of the inter packet information with header information. This encapsulation of the packets is done so as to enable packets to be detected at the receiver reliably, even if the packets are of variable length, without having to know the contents of the packet. This makes the transmission independent of the contents of the packet, and so independent of information for OSI layer 2 or 3 processing.

A block 500 is provided for FIFO control and for generating header information, special headers and normal headers for replacing line codes such as gap codes at appropriate times, depending on which type the input data signal is, and on which gap codes are present. Normal headers can't be created until a complete frame is in the FIFO. Special headers for stuffing into the SDH container are generated either while waiting for a complete frame in the FIFO or when the FIFO empties of ordered sets. To generate special headers to replace ordered sets requires examining sequences of ordered sets (eg sync clock request) and detection of a non-modulo 4 number of octets before a start of frame.

Note that a Normal header goes at the start of a packet and gives the distance to the next header, which will be a special header at the end. Therefore the sending interface can't start sending a packet until the end is received in a FIFO. Therefore data over the SDH network can't run out during a packet. Therefore stuff special headers will only occur during intervals between packets.

Block 520 is a selector to provide for insertion of headers, provide parallel-serial conversion and control output timing, ready for the next stage which would be multiplexing and SDH framing. Generation of the SDH container is standard practice (may be one container, real concatenation or virtual concatenation) and is equipment specific.

Figure 5:
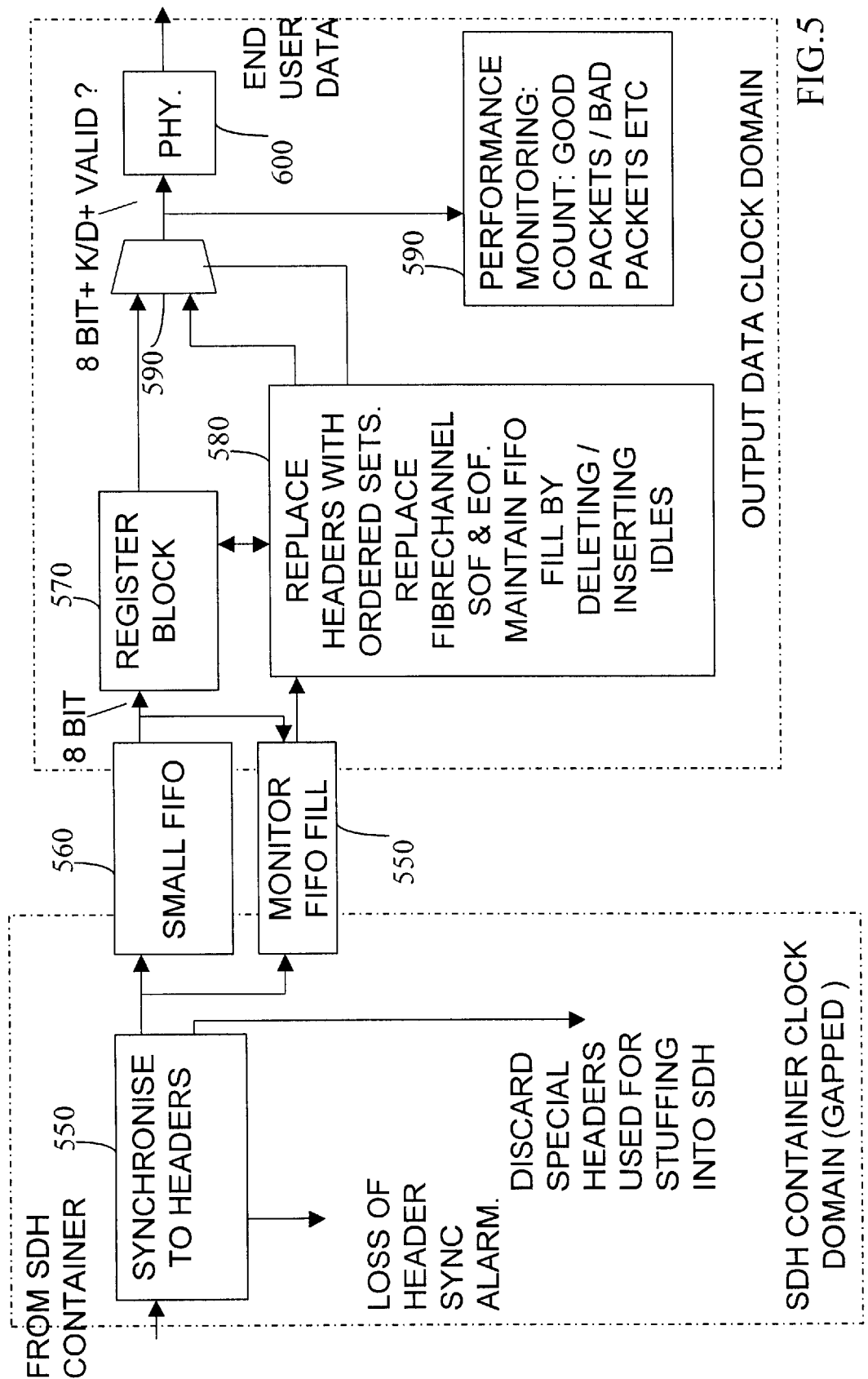
FIG. 5 shows functional elements of an embodiment of the receiver interface.

FIG. 5, Receiving Interface Functions

The receiving interface comprises a block 550 for maintaining synchronisation with the headers so that packet start and end points can be identified even for variable length packets. Any headers added purely for stuffing, without carrying inter-packet information are discarded here. An alarm may be raised if header sync is lost, since this may cause loss of data if the packet start and end points cannot be recognised. Serial-parallel conversion would be carried out on the data. A small FIFO 560 is provided at the next stage, controlled by a FIFO fill monitor 550, to bridge the two clock domains, the SDH container clock and the output data clock domain. The FIFO size should be enough to overcome SDH overhead gaps, discard of stuff headers and allow for data rate differences.

A register block 570 is provided under the control of block 580 to enable replacement of headers with corresponding ordered sets, to achieve recovery of the original signal. Furthermore, special processing of Fiberchannel SoF and EoF is carried out here, as will be described with reference to FIG. 7. Selector block 590 is also controlled by block 580 and enables insertion of headers at the correct time. This block outputs an 8 bit signal with an indication of normal or special characters (K/D), and an indication of code violations if necessary, to the physical interface 600 for outputting. The above mentioned spoofing could be carried out by block 580. This would involve intercepting a handshaking request and replying with an artificial acknowledgement on behalf of the true destination of the data.

A performance monitoring block 590 may be provided here or remotely, for establishing performance for use in QoS measurements which may be used as a basis for charging a client by a service provider, for data transmission.

The Clocks at the Receiving Interface

On receipt of data from the SDH link, special headers used for stuffing on the link are discarded. Other special headers are converted to the appropriate ordered sets.

Once this is done, the data rate is the same as the end user input data rate at the other end of the link, so two alternatives are available to derive a clock for outputting the data:
a) Use a PLL Locked to the Data:
This has the advantage of a matching data rate, but has disadvantages of jitter, smoothing circuitry and so on.
b) Synthesize Nominal Data Clock Frequency.
This has the advantage of generating a cleaner clock but requires data rate matching by inserting/deleting link 'idles' between packets. Idle insertion is relatively easy to implement (but must not occur in the middle of a sequence of ordered sets). In any case, inserting or deleting idle codes is considerably easier than inserting or deleting bits at high data rates. Idle deletion may require a wait of a couple of frames for an opportunity.

A preferred implementation involves using an SDH node clock (+/−4.6 ppm) to generate a data clock at upper end of allowed tolerance. This would give a greater likelihood of having to insert than delete idle codes. Clock tolerance is +/−100 ppm for Fiberchannel. Ethernet/Fast Ethernet is +/−50 ppm (RMII consortium spec) RMII consortium spec includes some useful notes on allowed shrinkage of interpacket gaps. The Gigabit Ethernet spec is +/−100 ppm. It's been suggested that devices should tolerate about +/−150 ppm to accept data from any NICs.

FIG. 6 Packet Delineation in the Receiver

To detect packet start and end at the receiver, the well known HEC (Header Error Correction) technique used and standardised for ATM cannot be used if the delineation has to cope with unknown and varying packet lengths. Therefore, it is modified as shown in FIG. 6.

The delineation now uses a four octet sequence in which the two octet length field replaces the 'knowledge' of the fixed length ATM cells, the other two octets are the CRC-16 of the length. The length indicates the distance in bytes to the next 'header'. This complicates synchronisation due to the possibility of bit errors induced in the length field, but there are known techniques for handling this.

It can be seen that a 4 octet header quantises the users interpacket gap in steps of 4 octets. Fibre channel minimum interpacket gap is 6 'Primitives' from a transmitter, which may be reduced to a minimum of two 'Primitives' at a receiver. The gap varies in steps of 1 'Primitive'. Ethernet minimum interpacket gap from a transmitter is 12 octets, which may be reduced. At a receiver. Gigabit Ethernet gaps vary in steps of 1 octet. The header also needs to carry the nature of the 'Primitives' used on the link during interpacket gaps. (eg: Fibrechannel 'Synchronise Clock Request' uses 6 Primitives.

A current assumption for Fibrechannel is that at the receiving interface the normal header (indicates start and length of a packet) can always be replaced by the ordered set meaning Idle. If this assumption isn't always valid, it may be necessary to introduce extra code options into the special headers, so that the preceding special header also indicates the ordered set of the next one. For Gigabit ethernet it is replaced by the SofF special character and three octets of preamble.

There should be at least two headers between frames (the trib should probably be able to operate with equipment which has already shrunk the interpacket gap somewhat). This could be used to improve the reliability of acquiring sync to the headers. The carriage of interpacket gap information could be exploited to make a WAN with the equivalent of Ethernet auto-negotiation.

Special Headers

To distinguish the Special header from the Normal header, one way is to reduce the maximum possible packet length. Lots of ways to do this, easiest to explain is the reduce it from 2^16 to 2^16-X. Any length values in the range 2^16-X to 2^16 mean this is a special header (of length 4 octets) which will be followed by a normal header. X codes are therefore now available to encode the meaning of the primitive (4 octets) which this header replaces.

One code is reserved for a header used solely for stuffing the data rate to suit the SDH data rate. It is only inserted (as are all headers) between packets, and it is discarded at the other end of the SDH link. For use with protocols (eg ethernet) in which the interpacket gap is not quantised in units of 4 octets, there should be enough codes to include the information that this header replaces either 4, 5, 6 or 7 octets of interpacket gap code Z.

Not many codes are needed for the information which may be in the idle codes, at least for the incoming digital data formats described above. Fibre channel has about 9 'Primitives' including those used for Idle and for Clock Synchronisation. All are 4 octets. For Ethernet there are 4 length options each of which needs to also represent the underlying link code. The number of link codes for Gigabit Ethernet seems to be 2 (4 octet) for configuration, effectively 1 for idle (2 octets), and 2 or 3 for the End of Frame to denote ending with idle or carrier extend. Even code group boundaries may need to be treated differently. The error propagation special character should not be created by Gigabit ethernet devices other than repeaters, so it's assumed that the trib will not receive any. It may be desirable to create some in the link, following detection of input code violations.

FIG. 7, Special Case of Delineation of Fibrechannel Frame

The fibre channel Start of Frame and End of Frame indications are also ordered sets which once decoded from 8b/10b cannot be sent directly over an octet structured link. There are several possible SOF and EOF delimiters with different meanings.

One way to handle this is to specify as follows:
The first 4 octets following a Normal header encode the type of SOF
The last 4 octets in a packet (before any type of Header) encode the type of EOF.
The 'knowledge' that the link is Fibrechannel could be provisioned or it could be automatic (involving recognition of user data rate/ordered sets, and encoding ordered sets into special headers so that the far end also knows). It would be possible to encode more directly the ordered sets (as opposed to 'code y=fibrechannel SOF normal class 2') The running disparity used in 8b/10b is normally based on the current running disparity on a character by character basis. But for ordered sets, it's defined for each character. So it's probably safer to stay with a 'code book' of ordered sets (which might need to be upgraded in future).

To delineate Gigabit ethernet frames: There is a single special character used for SofF (K27.7) which replaces the first pre-amble octet. So a normal header will replace the SofF and the following three preamble octets. A single special character is used for EofF which follows the last octet of data, but this seems to be followed by one carrier extend special character and then either further carrier extends or idles. The first special header following a frame needs to encode this difference.

Handling Code Violations

Fibrechannel permits modifying the EOF ordered set to indicate a frame with code violations. Possibly the more transparent solution is to carry to the destination end the information that a code violation occurred and then get the destination to create another code violation at about the right place.

Scrambling

Scrambling may be useful to prevent 'killer packets' from either disturbing SDH sync recovery or (possibly) disturbing header sync. Options available include: selfsync over packet contents or whole payload (if over packet contents, this assumes that self sync runs continuously from one set of packet contents to the next), or set/reset type. If set/reset type, which would restart at the beginning of each packet, the usual security objections can be overcome by using random seed values. The seed value could be transferred by waiting for a long run of idles between packets and then using a special header.

Notes on Other Matters

Normal headers can't carry any info other than length, so the far end needs to know (from previous special headers) that the link is Ethernet. There are two options for the location of the normal header with Gigabit Ethernet. It could be located starting with the/S/start of packet indicator on the "enet", or it could be aligned starting 4 octets before as proposed for fibrechannel. If 4 octets before, then the first 4 octets of the packet would be pre-amble or a code to indicate pre-amble.

Gigabit ethernet carrier extend is only used on half-duplex links, which would be illogical (very slow) over a Wan. Hence ignore packets ending with carrier extend, otherwise a code is needed for a special header to indicate EofF with carrier extend and a code to indicate 'carrier extend idle 4/5/6/7 octets'.

Other Examples, Variations

Although the embodiments described show replacing idle codes with headers to maintain the bit rate, it would be possible to simply add headers without replacing idle codes. This would result in the bit rate changing for transmission.

The packet delineation could be performed using SDL encapsulation techniques as an alternative to the packet delineation described above using the normal headers. The replacement of idle codes by special headers and the insertion or deletion of idle codes to compensate for clock differences, could be combined with such SDL-type encapsulation.

Above has been described an interface for converting a variety of incoming digital signals into SDH/SONET format for transmission on a synchronous digital network, by identifying the line code of the incoming digital signal, without identifying the information for OSI layer 2 or 3 processing, i.e. format of each packet. Headers are used to encapsulate incoming packets, and enable packets to be discriminated at the receiver. Advantages of performance monitoring capability and transparency are combined. Identifying line codes enables a greater degree of error detection, than a bit based interface. Also synchronisation can be simpler since line codes for padding can be added or deleted more easily than adding or subtracting bits. The interface is semi-transparent in the sense that identification of line codes limits the interface to those formats that use identifiable line codes, but without limiting to a particular OSI layer 2 or 3 frame format.

Other variations of the described embodiments, and other applications of the invention can be conceived and are intended to be within the scope of the claims. References to software are intended to encompass both software on a computer readable medium, and software delivered over a transmission medium.

What is claimed is:

1. A sending interface for converting an incoming digital signal into a format for transmission on a synchronous digital network, the incoming digital signal having a group of bits coded by a predetermined line code, the incoming digital signal also carrying information for OSI layer 2 or 3 processing, the sending interface comprising:

circuitry for identifying the line code of the incoming digital signal, and circuitry for carrying out the conversion of the incoming digital signal according to the line code identified, and independently of the information for OSI layer 2 or 3 processing.

2. The sending interface of claim 1, the circuitry for identifying a line code comprising circuitry for identifying an idle code in the incoming digital signal.

3. The sending interface of claim 1, the circuitry for identifying a line code comprising circuitry for identifying a type of idle code, and the circuitry for carrying out the conversion being arranged to include in the synchronous data signal the type of idle code identified.

4. The sending interface of claim 1, wherein the incoming digital signal comprises packets, and the circuitry for carrying out the conversion is arranged to replace one or more of the idle codes with a header for indicating the length of an associated one of the packets.

5. The sending interface of claim 1, wherein the header is of a fixed size.

6. The sending interface of claim 1, wherein the interface is adaptable to receive incoming digital signals of more than one rate.

7. The sending interface of claim 1, wherein the format for the synchronous digital network comprises SONET/SDH virtual containers.

8. The sending interface of claim 7, the interface comprising circuitry for carrying out virtual concatenation of the SONET/SDH virtual containers.

9. The sending interface of claim 1, the interface comprising a multiplexer for multiplexing more than one incoming digital signal onto the synchronous digital signal.

10. A sending interface for converting an incoming digital signal into a format for transmission on a synchronous digital network, the incoming digital signal having a series of packets, and a group of bits coded by a predetermined idle code separating the packets, the sending interface comprising:

circuitry for identifying the idle code of the incoming digital signal, and circuitry for carrying out the conversion of the incoming digital signal according to the idle code identified.

11. A receiver interface for recovering an incoming digital signal from a signal of a format used for transmission over a synchronous digital network, the incoming digital signal having a group of bits coded by a predetermined line code, the incoming digital signal also carrying information for OSI layer 2 or 3 processing, the receiving interface comprising:

circuitry for identifying linecode information in the formatted signal, and circuitry for replacing the identified linecode information with corresponding linecodes independently of the information for OSI layer 2 or 3 processing.

12. The receiver interface of claim 11, further comprising a retimer, for inserting or deleting one or more of the linecodes to match the incoming data rate to a required outgoing data rate.

13. The receiver interface of claim 11 arranged to receive SONET/SDH virtual containers.

14. The receiver interface of claim 11 further comprising circuitry for combining information from virtually concatenated containers before recovering the original incoming digital data signal.

15. A method of converting an incoming digital signal into a format for transmission on a synchronous digital network, the incoming digital signal having a group of bits coded by a predetermined line code, the incoming digital signal also carrying information for OSI layer 2 or 3 processing, the method comprising the steps of:

identifying the line code of the incoming digital signal, and converting the incoming digital signal according to the line code identified, and independently of the information for OSI layer 2 or 3 processing.

16. Software for carrying out the method of claim 15.

17. A SDH/SONET network element comprising a sending interface for converting an incoming digital signal into a format for transmission on an SDH/SONET network, the incoming digital signal having a group of bits coded by a predetermined line code, the incoming digital signal also carrying information for OSI layer 2 or 3 processing, the sending interface comprising:

circuitry for identifying the line code of the incoming digital signal, and circuitry for carrying out the conversion of the incoming digital signal according to the line code identified, and independently of the information for OSI layer 2 or 3 processing.

18. Apparatus for detecting transmission errors by a synchronous digital network used to transmit an incoming digital signal, the apparatus comprising a receiver interface for recovering the incoming digital signal from a signal of a format used for transmission over the synchronous digital network, the incoming digital signal having a group of bits coded by a predetermined line code, the incoming digital signal also carrying information for OSI layer 2 or 3 processing, the receiving interface comprising:

circuitry for identifying linecode information in the formatted signal, circuitry for replacing the identified linecode information with corresponding linecodes independently of the information for OSI layer 2 or 3 processing, and circuitry for determining errors in the recovered signal compared to the incoming digital signal, independently of the information for OSI layer 2 or 3 processing.

19. A method of using a data transmission service provided over a telecommunication network, comprising the step of causing data to be transmitted across a sending interface as set out in claim 1.

* * * * *